Figure 1:
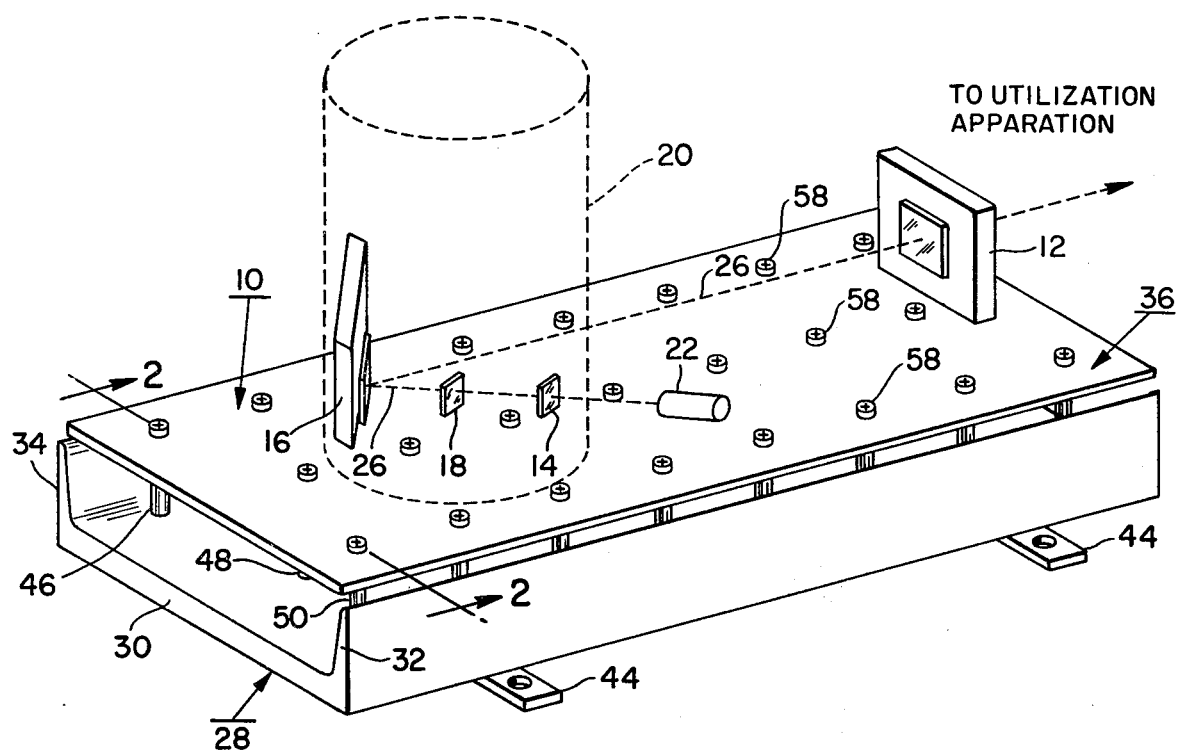

United States Patent [19]

May, Jr.

[11] 4,157,802
[45] Jun. 12, 1979

[54] RIGID THERMALLY STABLE STRUCTURE FOR SUPPORTING PRECISION DEVICES

[75] Inventor: William G. May, Jr., Fairport, N.Y.

[73] Assignee: Burleigh Instruments, Inc., East Rochester, N.Y.

[21] Appl. No.: 816,060

[22] Filed: Jul. 15, 1977

[51] Int. Cl.² .................................................. A47B 91/00
[52] U.S. Cl. .............................. 248/346; 248/DIG. 1; 350/310
[58] Field of Search ...................... 248/346, DIG. 1; 285/DIG. 6; 52/573; 403/30, 29; 14/16.1; 356/106 R; 350/310

[56] References Cited

U.S. PATENT DOCUMENTS

| | | | |
|---|---|---|---|
| 3,069,123 | 12/1962 | Angele et al. | 248/346 |
| 3,077,958 | 2/1963 | Grimsey, Jr. | 52/573 X |
| 3,201,076 | 8/1965 | Deleuze | 52/573 X |
| 3,352,198 | 11/1967 | Klute | 356/106 R |
| 3,397,856 | 8/1968 | Sullivan et al. | 14/16.1 X |
| 3,429,543 | 2/1969 | Mooney | 248/346 |
| 3,490,187 | 1/1970 | Stauffer et al. | 52/615 X |
| 3,530,994 | 9/1970 | Bourssa et al. | 248/346 |
| 3,823,772 | 7/1974 | Lavering et al. | 403/30 |
| 3,854,159 | 12/1974 | McLean | 14/16.5 |
| 3,912,380 | 10/1975 | Klein | 350/310 |
| 3,941,480 | 3/1976 | Webster | 356/106 R |
| 3,942,880 | 3/1976 | Zeiders, Jr. | 350/310 |
| 3,972,618 | 8/1976 | Hanes | 356/106 R |

FOREIGN PATENT DOCUMENTS

1101015  3/1961  Fed. Rep. of Germany ...... 356/106 R
1245650 10/1960  France ..................................... 248/346

*Primary Examiner*—James T. McCall
*Attorney, Agent, or Firm*—Martin LuKacher

[57] ABSTRACT

A rigid thermally stable structure provides a platform on which devices may be supported in precise positional relationships. The platform is provided by a thin plate of material having a coefficient of thermal expansion which is relatively low, such as may be fabricated from an iron nickel alloy of the type manufactured under the trade names Invar and Super-Invar. A rigid base of material which may have a high thermal expansion coefficient is also provided. The thin plate is attached to the rigid base by an array of posts which imparts thereto the rigidity of the base for preventing flexural movement of the plate while permitting the base and plate to move with respect to each other as their longitudinal dimensions change with temperature. The thin plate therefore provides a rigid and thermally stable platform.

14 Claims, 2 Drawing Figures

RIGID THERMALLY STABLE STRUCTURE FOR SUPPORTING PRECISION DEVICES

The present invention relates to support structures for precision devices and more particularly to a rigid thermally stable support structure which provides a thermally stable and rigid platform on which precision devices, such as optical components which provide a resonant laser cavity may be supported.

In order to maintain optical devices such as lenses and mirrors in alignment with each other, special tables, sometimes called optical flats, have been used. These tables are usually massive structures which are very rigid. Lower cost material such as light but rigid aluminum or steel members would be more advantageous to use to support optical devices than these massive tables. However, their dimensions change with temperature; increasing when the temperature rises and decreasing when the temperature falls. The change in a dimension is approximately proportional to the change in temperature and is related by a constant representing the change in dimension per unit change in temperature. This constant is known as the coefficient of expansion or the thermal expansion coefficient of the material. Certain materials have a low thermal expansion coefficient. These include alloys of iron and nickel. They are sold under trade names such as Invar and Super-Invar, by the Carpenter Steel Company and Simmonds Steel, Inc. The coefficient for Invar does not exceed $1.6 \times 10^{-6}$ centimeter per centimeter per degree centigrade while Super-Invar material has a coefficient to thermal expansion of less than $0.36 \times 10^{-6}$ centimeter per centimeter per degree centigrade, according to their manufacturer's specifications. These materials are however expensive and to provide an optical table which is constructed from one of these alloys would make its cost prohibitive.

The problems arising from thermal expansion of material have existed for some time. Isolation of elements subject to thermal expansion such as a refrigeration unit has been suggested (see Keating U.S. Pat. No. 3,369,783). Also considered has been the use of slide plates which allow one member to move with respect to the other when their dimensions change due to thermal expansion and contraction (see Milk, U.S. Pat. No. 2,680,259). A rigid thermally stable structure which can provide a platform for precision devices such as optical elements and yet can be fabricated at low cost from materials which are not extremely massive and heavy in weight has not yet been made available.

It is therefore an object of the present invention to provide improved apparatus which affords a rigid and thermally stable platform suitable for supporting precision devices, such as optical devices, and to maintain such devices in precise positional relationship notwithstanding changes in temperature.

It is another object of the present invention to provide an improved rigid structure which is dimensionally stable in spite of temperature changes.

It is a further object of the present invention to provide an improved rigid and thermally stable platform which minimizes the use of high cost materials having low thermal expansion coefficient and can be fabricated at low cost.

It is a still further object of the present invention to provide an improved rigid and thermally stable platform which uses a thin plate of material having a low coefficient to thermal expansion, such as Invar and Super-Invar iron nickel alloys.

Briefly described a structure in accordance with the invention for supporting and maintaining devices in precise positional relationship with respect to each other, uses a rigid base member of material which may have a relatively high thermal expansion coefficient. A plate is also used which is flexible about the plane thereof and consists of material having a coefficient of thermal expansion much lower than the coefficient of thermal expansion of the base. This material may be an iron nickel alloy such as made of Invar or Super-Invar alloys. The plate may be thin such that the amount of the low thermal expansion material, which may be expensive, is minimized.

An array of posts extends vertically between the base and the plate. The posts are attached at one end to the base and at their opposite ends to the surface of the plate which is opposed to the base. The means of attachment may include an array of holes in the plate which are in registry with the posts and through which portions of the posts or portions of the attaching devices may extend, allowing clearance around the periphery of the holes. The plate thus rests on shoulders of the posts and enables the end of the posts to shift slightly with respect to the plate at the point of their attachment. The rigidity of the base is imparted to the plate such that flexural movement with respect to the plane of the plate is prevented. The posts permit the movement of the plate and base both laterally and longitudinally with respect to each other with temperature; thus, decoupling the plate and the base with repsect to each other for thermal dimensional changes. The plate provides a rigid and thermally stable platform on which the precision devices, such as the optical elements which form a lasar cavity, may be supported in precise positional relationship.

Figure 2:
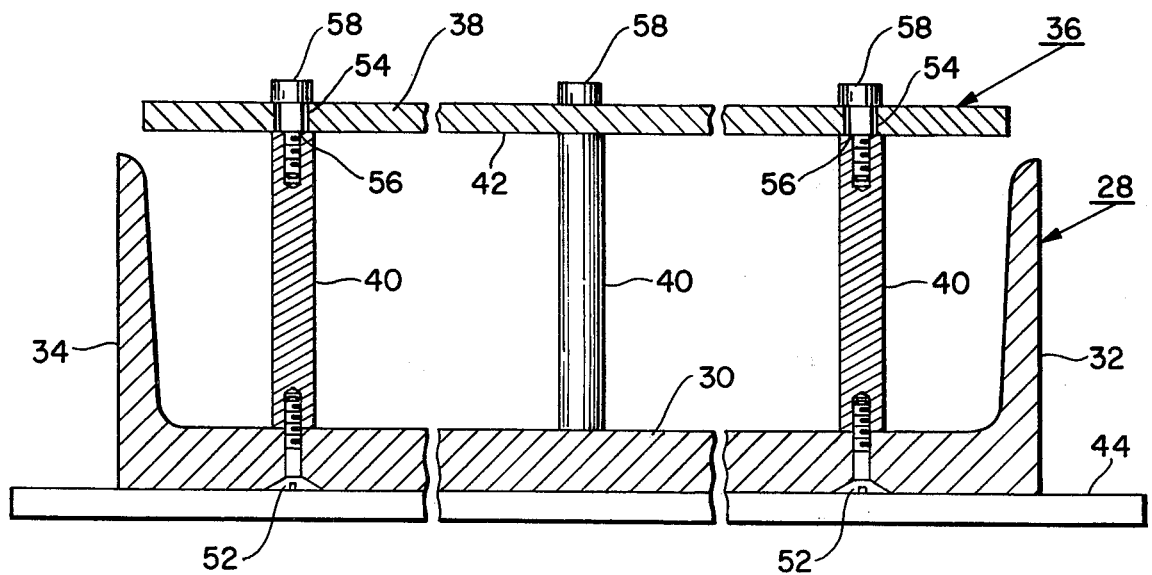

The foregoing and other objects, advantages and features of the present invention as well as the presently perferred embodiment thereof will be more apparent from a reading of the following description in connection with the accompanying drawings in which FIG. 1 is a perspective view of a rigid, thermally stable structure which provides a platform for supporting optical devices forming a resonant laser cavity which structure is constructed in accordance with an embodiment of the invention; and FIG. 2 is a cross-sectional view of the structure shown in FIG. 1, the section being taken along the line 2—2 of FIG. 1 when viewed in the direction of the arrows.

By way of an example of the precision devices which may be supported on a rigid thermally stable platform 10 provided by the invention, are optical devices, namely mirrors 12, 14 and 16 which form the resonant cavity of a laser. This laser may be a color center laser using a color center crystal 18 which may be supported from elements in a housing 20, indicated by the dash line, which is supported on the platform 10. The housing may contain a vacuum and cryogenic chamber as well as the elements which provide support for the color center crystal 18. A pump source of coherent light in the form of a pump laser 22 drives the color center laser, as via the mirror 14. The optical devices which provide the laser cavity must be supported and maintained in precise positional relationship such that the beam paths 26 do not vary either in position or length.

This is accomplished by means of the rigid thermally stable platform 10.

The platform 10 is provided by a base member 28 which is rigid both longitudinally and laterally. This rigidity is provided by virtue of the base member being in the form of a channel having a web 30 and sides 32 and 34 which give a large cross-section to the base 28. The base may alternatively be a fixed slab, a box beam or other member having rigidity both longitudinally and laterally thereof. The base may be made of aluminum or steel and thus may be fabricated at low cost.

The platform is provided by a thin plate 36 of material having a low coefficient of thermal expansion. This material may be a iron nickel alloy such as Invar, Super-Invar or material of the same type as Invar or Super-Invar. The plate 36 is rectangular in shape and has a width slightly less than the width of the base member 28 across the web 30 thereof (see FIG. 2). The plate 36 by virtue of its thinness is flexible about the plane thereof (viz, the plane of the top surface 38 of the plate 36).

An array of posts 40 extends vertically between the base 28 and the plate 36 and separates the bottom surface 42 of the plate from the base 28 so that the bottom surface 42 and the upper surface of the web 30 are opposed to each other. The posts are narrow cylindrical rods which may be made of steel. The posts 40 provide vertical support for the plate 36 and prevent flexural movements about the plane of the plate 36, while rendering the plate rigid for movement both laterally and longitudinally. The thickness of the base 28, considering its cross-sectional area, is much larger than the thickness of the plate 36. The rigidity of the base 28, obtained by virtue of this thickness, is imparted to the plate 36 by the attachment of the plate 36 and the base 28 to the posts 40 at opposite ends of the posts 40. Longitudinal or lateral movement of the base due to thermal expansion and contraction is however not transferred to any significant extent to the plate 36 such that the rigidity of the plate 36 both laterally and longitudinally within the plane of the plate 36 is not affected. The plate 36 thus provides a rigid thermally stable platform for the optical devices which form the laser cavity as shown in FIG. 1.

The sides 32 and 34 of the base 28 extend upwardly to the sides of the plate 36 thus providing protection for the region containing the posts 40 which region may be used to house cables and other equipment for the operation of the laser. The sides 32 and 34 may however be disposed in the opposite direction away from the plate 36 and form legs on which the platforms may stand. In the configuration shown, support brackets in the form of rods 44 which are attached to the base 28 may be used to support the platform 10.

The posts 40 are arrayed in three rows, 46, 48 and 50, which are parallel to each other and are also parallel to the longitudinal edges of the plate 36. The posts 40 of the outer rows 46 and 50 are in alignment with each other, while the posts of the inner row 48 are offset between the posts of the outer rows. A sufficient number of posts is used so as to transfer the rigidity of the base 28 to the plate 36 and other arrangements than shown may be used. The lower ends of the posts 40 may be attached to the web 30 by means of screws 52.

The attachment of the plate 36 to the upper ends of the posts 40 makes use of an array of holes 54 in the plate 36. The holes 54 are in registry with the posts 40, but have a diameter less than the diameter of the posts such that the surface 42 of the plate 36 is supported on shoulders 56 of the posts 40 around the peripheries of the holes 54. The shafts of screws 58 which attach the upper ends of the posts 40 to the plate 36 are smaller in diameter than the diameter of the holes 54 so as to provide clearances between the screw shaft and the peripheries of the holes 54. Alternatively, the posts 40 may have reduced diameter upper ends which extend through the holes 54. Either these extensions may be externally threaded to receive nuts or the posts may be internally threaded to receive the screws 58 as shown. The clearances between the shafts of the screws and the holes 54 allow some rotation at the attachment between the plate 36 and the upper ends of the posts which further reduces any transfer of motion in the longitudinal or lateral directions due to dimensional changes in the base 28 to the plate 36.

Typical dimensions of the components are:
web 30, base 28: 24 inches long, 12 inches wide
web 30, sides 32, 34: 3 inches high
plate 36: 21 inches long, 12 inches wide, 3/16 inch thick
posts 40: 30 inches high, ⅜ inch diameter From the foregoing description it will be apparent that there has been provided an improved support structure which affords an improved thermally stable platform especially adapted for supporting precision devices such as the optical elements of a laser cavity. While a preferred embodiment of the invention has been described, it will be appreciated that variations and modifications therein within the scope of the invention will undoubtedly suggest themselves to those skilled in the art. Accordingly, the foregoing description should be taken merely as illustrative and not in any limiting sense.

What is claimed is:

1. A structure for supporting and maintaining devices in precise positional relationship with respect to each other, said structure comprising
    a rigid base member,
    a plate which is flexible about the plane thereof when unsupported, said plate consisting of material having a coefficient of thermal expansion much lower than the coefficient of thermal expansion of said base member, and
    an array containing a plurality of posts extending vertically between said base member and said plate and said posts being attached at opposite ends to said plate and to said base member and maintaining and supporting said plate rigidly in the plane thereof.

2. The invention as set forth in claim 1 wherein said plate is thin in thickness and has a cross-sectional thickness less than the cross-sectional thickness of said base member.

3. The invention as set forth in claim 2 wherein said base member has side walls and a web extending therebetween.

4. The invention as set forth in claim 1 wherein said plate has longitudinal and transverse dimensions not exceeding the longitudinal and transverse dimensions of said base.

5. The invention as set forth in claim 4 wherein said base forms a channel having a web and sides extending vertically from the longitudinal edges of said web, said plate having a length not exceeding the length of said channel and a width not exceeding the width of said channel, said posts disposed in a plurality of rows.

6. The invention as set forth in claim 5 wherein said sides extend in a direction toward said plate up to about the height of said posts such that said plate is disposed between said sides.

7. The invention as set forth in claim 2 wherein said plate is rectangular and said base member is a rectangular section, said base member section and said plate having surfaces which are opposed to each other said posts being disposed vertically between said opposed surfaces.

8. The invention as set forth in claim 7 wherein said opposed surfaces are planes substantially parallel to each other.

9. The invention as set forth in claim 2 wherein said plane has an array of holes which extend through the thickness thereof, said array of holes being in registry with said array of posts, the cross-sectional width of said posts being larger than the width of said holes so as to define shoulders on said posts about the peripheries of said holes on which said plate is disposed, and means engaging said plates in regions around the peripheries of said holes for clamping said plates and said shoulders of said posts.

10. The invention as set forth in claim 9 wherein said clamping means are screw fasteners in threaded engagement with said plate.

11. The invention as set forth in claim 9 wherein said array of posts comprises a plurality of rows of posts which are disposed in parallel planes perpendicular to said plate.

12. The invention as set forth in claim 11 wherein said plate consists of material selected from alloys of iron and nickel including Invar and Super-Invar.

13. The invention as set forth in claim 1 wherein said devices are optical devices, said devices being mounted on the surface of said plate which is opposite from said base member.

14. The invention as set forth in claim 13 wherein said optical devices include a plurality of mirrors and define a laser resonator cavity.

* * * * *